United States Patent
Holland

[19]

[11] Patent Number: 5,816,883
[45] Date of Patent: Oct. 6, 1998

[54] FIBER OPTIC WAND WITH ILLUMINATED FIGUREHEAD

[75] Inventor: Stanley Holland, Northridge, Calif.

[73] Assignee: Superlights, Inc., Northridge, Calif.

[21] Appl. No.: 797,415

[22] Filed: Feb. 10, 1997

[51] Int. Cl.[6] .............................. A63H 33/22; F21V 7/04
[52] U.S. Cl. .......................... 446/219; 446/72; 446/485; 362/32; 362/808
[58] Field of Search .............................. 446/485, 27, 72, 446/219; 362/32, 808, 105, 106

[56] References Cited

U.S. PATENT DOCUMENTS

| | | | |
|---|---|---|---|
| 879,640 | 2/1908 | Hockenberry | 446/485 X |
| 3,791,068 | 2/1974 | Pietrowiak . | |
| 4,665,568 | 5/1987 | Stutes | 362/106 |
| 4,858,083 | 8/1989 | Wakimoto . | |
| 4,998,186 | 3/1991 | Cocca | 362/32 X |
| 5,037,346 | 8/1991 | Cimock . | |
| 5,105,343 | 4/1992 | Wakimoto . | |
| 5,138,535 | 8/1992 | Aragon, Jr. | 362/102 |
| 5,277,644 | 1/1994 | Osborne et al. | 446/219 |
| 5,288,259 | 2/1994 | Konta . | |

Primary Examiner—Robert A. Hafer
Assistant Examiner—Laura Fossum
Attorney, Agent, or Firm—McHale & Slavin P.A.

[57] ABSTRACT

A fiber optic wand novelty device for children utilizing a caricature illuminated in a constant color with a plurality of optical fibers extending therefrom. A mount for the optical fibers is secured to an illumination device and includes a color pallet so as to cause colored tip illumination of the optical fibers. The holder of the fibers may be of a fixed color and serves to orient the proximal end of the optical fiber bundle directly over the light source. Accordingly, the colored light is conveyed through fibers, with the longitudinal lengths of the fibers producing solid, whitish light. The holder therefore allows the caricature head to be made of a predetermined color and allows for a realistic likeness under normal lighting conditions and a predetermined colorization or illumination when placed in a darkened environment. The head illumination is thereby not affected by a fixed or everchanging colored light produced at the ends of the fiber optics which extend from an aperture through the end of the caricature head.

15 Claims, 1 Drawing Sheet

FIBER OPTIC WAND WITH ILLUMINATED FIGUREHEAD

FIELD OF THE INVENTION

This invention relates to the field of illuminated novelty devices and in particular to an illuminable figurehead used in combination with a fiber optic bundle providing a unique novelty device for children.

BACKGROUND OF THE INVENTION

Children have particularly inquisitive minds and are easily attracted to animation figures and the phenomenon of light, especially colored light. For this reason, novelty items have caught the interest of children for both educational and entertainment purposes. This interest has resulted in an entire industry being developed around such items.

U.S. Pat. No. 3,791,068 discloses an illuminated doll constructed of a translucent flesh colored material. Illumination is accomplished by use of a battery powered light placed within the confines of the structure thereby allowing the translucent material to glow in a darkened environment. The illumination allows the device to be placed in a darkened room wherein the inventor describes the effect on children to be soothing, especially if the doll is of a figurine that is known to provide comfort to children. This device is limited in display of color to that of the translucent material.

U.S. Pat. No. 4,858,083 utilizes a flashlight in combination with a transparent hollow body having a light scattering liquid. The liquid further includes a plurality of small pieces of reflecting plates. When the flashlight is operating, the light is directed through the fluid wherein the reflecting material directs the light to project outwardly in various patterns. The problem with this device is that it prohibits control of the light colors. Thus, if a flesh colored doll head is used in combination with the device, the flesh colors would be changed upon a reaction with the color.

U.S. Pat. No. 5,105,343 is an improvement of the aforementioned patent teaching a decorative device which includes a colored disc placed over the end of a light. Light directed through the plate produces various colors. This includes the ability to illuminate a decorative portion of the device which may include a doll. In addition, so that light is illuminated outwardly with various colors, the invention includes a liquid such as trichloroethylene, carbon tetrachloride, chloroform, water or a homogenous mixture. The inability to control the color production remains a problem with this improvement patent.

U.S. Pat. No. 5,037,346 discloses yet another novelty item incorporating a flashlight. This device includes a filter allowing a variety of colors to be produced for transmittal into a transparent enclosure which houses reflecting objects in a non-liquid state. The reflecting objects can be moved into random positions and interact with different colored beams.

U.S. Pat. No. 5,288,259 discloses a doll with illuminated hair. The hair is simulated, with some of the strands of the hair being formed from optical fibers. The inventor's preference is to mix optical fibers with non-optical fibers so that the light effects are mixed into the toy's hair. The invention further includes a multi-colored disc that allows for various colors to be introduced into the fiber optics for illumination of the hair. The device, however, lacks the ability to illuminate the doll face or control the color tones.

Another known device employs fiber optics extending from the end of a penlight flashlight. However, this device does not include a figurehead.

Therefore, what is lacking in the art is a novelty device that incorporates a conventional penlight flashlight with a translucent head and optic fibers extending outwardly therefrom wherein the translucent head may remain a single color while the tips of the optic fibers may produce a firework type display.

SUMMARY OF THE INVENTION

The instant invention consists of a penlight type flashlight having a form-fitting translucent caricature with optical fibers extending therefrom positionable on the top of the light. Upon illumination, the caricature will glow in the dark for the entertainment of children. The optical fibers may form a bundle of non-equal-distant strands having a chamfered distal tip which allows light to project through each fiber providing a soft, yet brilliant glow at the end of each fiber. The effect is that light is transferred through the transparent, translucent, or opaque optical fibers and provides no illumination or only a subdued illumination along the length thereof, with the majority of the light transferred to the tip of the optical fiber.

Each fiber tip is chamfered in such a way as to cause a substantial surface area to be exposed by use of a rough cut to provide for a brilliance of illumination. The optical fiber illumination is enhanced by the use of a colored pallet located at the proximal end of the optical fiber bundle. With this arrangement, the illumination of a translucent caricature head remains substantially one color by use of a holder for the fibers within the head. Accordingly, each optical fiber remains a white color as detected by the eye at the fiber mounting end inside the caricature head, while the exposed opposite end of each fiber appears colored. By movement of the device, the colored pallet rotates thereby causing the tips of the optical fibers to change in color. Alternatively, the disc can be fixed or eliminating providing a fixed color to each or all of the fiber optic tips. The result is an illumination toy having a caricature head of a single color with optical fibers that project multiple colors in a firework type display for entertainment for a child.

Thus, an objective of the instant invention is to provide an optical fiber illumination device having interchangeable caricature heads which can be illuminated with a repeatable, solid color.

Yet another objective of the instant invention is to provide a firework type display device used in combination with a caricature head for the entertainment of children.

Still another objective of the instant invention is to provide an optical fiber illumination device having optical fibers constructed of low grade flexible plastic material providing longitudinal illumination with a material that will not cause injury to a child during play.

Yet another objective of the instant invention is to disclose an illumination toy capable of maintaining the realistic caricature head colors when placed in use with fiber optics and a color pallet for changing the optical fibers.

Another object of the instant invention is to teach a cutting of optical fibers to form a whisk broom array.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
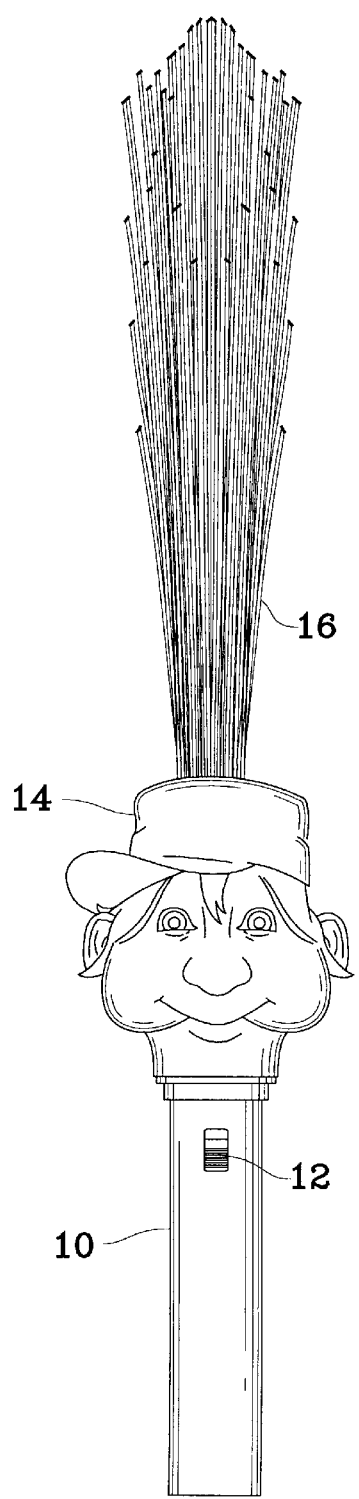
FIG. 1 is a pictorial view of the instant invention.

Now referring to FIG. 1, set forth is a pictorial view of the instant invention consisting of a housing 10 which forms a handle for holding of the device and includes a portable illumination system in the form of a flashlight with replaceable batteries wired to an on/off switch 12 for controlling of a light. When the device is actuated, the light illuminates translucent caricature head 14 which is attached to the top of the housing 10 by either a thread engagement or frictional fit. The caricature head 14 may include both human and non-human facsimiles making the representation limitless. Non-human type characters may consist of MICKEY MOUSE or the like WALT DISNEY characters, clowns, teddy bears, animals, or the depiction of human heads including, for instance, presidents and/or movie stars, space ships, full figures, and so forth.

Extending outward from an approximately 8 mm opening placed along an upper portion of the caricature 14, is a bundle 16 of optical fibers constructed from clear plastic forming flexible fibers extending upward and outwardly, all of which are terminate at unequal distances. The distal end 18 of each optical fiber 16 includes a rough cut which causes a brilliant display of light through the function of the fiber. The length of the fiber provides a subdued white light and the end of the fiber produces a colored illumination in response to a translucent or transparent color pallet, not shown, that is placed between the proximal end of each optical fiber and the illumination end of the device.

Figure 2:
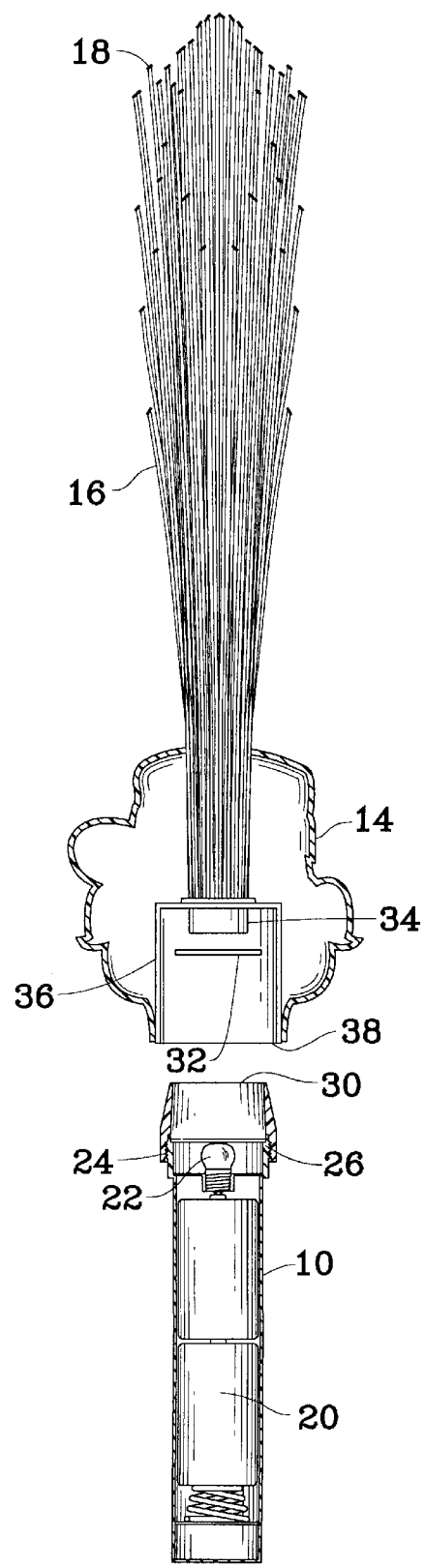
FIG. 2 is an exploded view of FIG. 1.

Referring to FIG. 2, the housing 10 is preferably made of a rigid material capable of supporting a plurality of batteries 20 in a series configuration which provides the required voltage for illumination of light 22 when the on/off switch 12 is placed in an energized position. The housing 10 includes a translucent focusing head 24 constructed from PVC which is secured to the housing 10 by use of engagement threads 24 aligned for easy replacement of the batteries by unthreading the focusing head 24 for removal and replacement of batteries 20. The translucent focusing head allows dispersion of light through the sidewall of the focusing head while directing the primary amount of light through end opening 26 into the character head 14.

Color pallet 32 which consists of one or more colors on a lightweight transparent material causes light transferring through the pallet 32 to illuminate the proximal end 34 of the optical fibers 16. The pallet 32 has an external diameter of about 21 mm. The color of brilliant illumination at each distal end 18 of the optical fibers 16 is directly dependent upon which optical fiber is in direct line of sight with the color pallet 32. The optical fibers 16 are secured to the character head in a rigid position wherein the optical fibers are placed into a bundle and secured to a PVC mounting housing 36 which can be permanently secured into the character head 14. The PVC mounting housing 36 has sufficient flexibility to frictionally engage the end of the penlight, the character head 14 is preferably glued to the housing 36. When the character head 14 is mounted to the housing 10, a portion of the character head 14 encompasses the translucent focusing head 24 for further focusing of the light 22 through the color pallet 32 and into the optical fiber holder 36 for delivery into the proximal end 34 of the optical fibers.

The illumination of the character head 14 may remain constant by placement of the proximal end 34 of the optical fibers 16 in a close position to the color pallet 32 wherein the character head operates as a carrier for the fibers. This arrangement prevents color transfer from the color pallet 32 to the character head as the optical fibers only allow a white illumination from the fibers along their longitudinal length, regardless of the color of light being transferred through each fiber. Thus, the optical fibers 16 that extend through the head serve to convey the color transitioning light through the head, yet without allowing the head to become subjected to such color changes. This provides a pleasant and beneficial effect in maintaining the head illumination at one color without an ever-changing and/or mottled appearance occurring upon the purposeful rotation of the disk 32.

Accordingly, unique to this invention is the manner of the mounting of the optical fibers 16 by use of the fiber holder 36. The optical fiber holder 36 is located near the bottom 38 of the caricature 14. This arrangement allows a majority of the fibers 16 to extend through the housing which causes illumination of the housing or caricature 14 with a fixed color. This is preferable in instances of caricatures that have a natural or flesh color wherein the color of the caricature can be made to remain constant despite the turning of the color pallet which would cause the angled cut ends 18 of the optical fibers 16 to illuminate with multiple colors. The effect is a stationary-colored caricature head 14, with optical fibers 16 within the head 14 and extending outward maintaining a white coloring, and with the angled cut ends 18 of the fiber exploding in a variety of colors as the color pallet is caused to turn which can be done by rotation of the caricature head.

The optical fiber holder 36 may be of any color. The color red has been found to be conducive to good light illumination in providing a normally flesh color caricature with a warm, rosy-colored glow when illuminated at night. As previously mentioned, the unique placement of the optical fiber bundle proximal end 34 in a secured position in relation to the optical fiber holder 36 thereby allows the only light transmitted from the inner surface of the caricature head to be that coming from: (a) the optical fiber holder 36, and/or (b) light coming from the sides of the lengths of optical fibers 16 that pass through the caricature head 14 for extension outward from the head.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A fiber optic illumination toy comprising:
    a self-contained illumination source having at least one battery and a lamp that is illuminated with energy from said battery;
    a switching means for allowing said lamp to operate upon demand;
    a caricature head having a first aperture located along a lower portion of said head for frictional securement to said illumination source and a second aperture located along an upper portion of said caricature head;
    a bundle of optical fibers having a proximal end and a distal end and a longitudinal length, said bundle formed from a plurality of flexible strands coupled to said lower portion of said head and extending through said second aperture, said proximal end of said bundle of optical fibers securely mounted in a translucent bundle holder along said bottom portion of said head;

a translucent focusing head secured to said illumination source and being in frictional engagement within said first aperture of said caricature head, said translucent focusing head defining a space between said lamp and said proximal end of said bundle of optical fibers; and a color pallet positioned between said translucent focusing head and said proximal end of said bundle of optical fibers and being in optical communication with and being spaced a distance from said lamp defined by said space;

wherein said lamp radiates a white light in said space through said translucent focusing head thereby providing illumination of said caricature head and further allowing illumination of at least a portion of said head by at least a portion of said longitudinal length of said fibers and said lamp simultaneously radiates through said color pallet whereby when light from said lamp is transmitted through said color pallet a particularly colored light beam is transmitted to the distal ends of said optical fibers while radiating white light along said longitudinal length of said fibers.

2. The fiber optic illumination toy according to claim 1, wherein said distal end of said optical fibers includes a saw cut so as to allow light dispersion at an angle inapposite to the longitudinal length of each said optical fiber.

3. The fiber optic illumination toy according to claim 1, wherein each said optical fiber is of a non-equal-distant length.

4. The fiber optic illumination toy according to claim 1, wherein said color pallet is rotatable.

5. The fiber optic illumination toy according to claim 1, wherein said caricature is constructed from translucent, transparent and/or opaque plastic materials allowing a realistic representation under normal lighting conditions and a surreal view by internal illumination during low level lighting conditions.

6. The fiber optic illumination toy according to claim 5, wherein said caricature is constructed from PVC.

7. The fiber optic illumination toy according to claim 1, wherein said bundle holder is formed of a PVC material, whereby said material allows for control of said caricature head internal illumination.

8. The fiber optic illumination toy according to claim 1, wherein said optical fibers are constructed from opaque, transparent, or translucent plastic.

9. The fiber optic illumination toy according to claim 8, wherein said optical fibers form a whisk broom array wherein said fibers each have a different length.

10. A fiber optic illumination toy comprising:

a self-contained illumination source having at least one battery and a lamp that is illuminated upon energizing from said battery;

a switching means for allowing said lamp to operate upon demand;

a caricature head having a first aperture located along a lower portion of said head for frictional securement to said illumination source and a second aperture located along an upper portion of said caricature head;

an optical fiber bundle formed from a plurality of flexible fiber optic strands of non-equal-distant longitudinal lengths coupled to said lower portion of said head, said optical fiber bundle having a proximal end securely mounted in a translucent bundle holder along said bottom portion of said head;

a translucent focusing head secured to said illumination source and being in frictional engagement within said first aperture of said caricature head, said translucent focusing head defining a space between said lamp and said proximal end of said bundle of optical fibers; and a color pallet positioned between said translucent focusing head and said proximal end of said bundle of optical fibers and being in optical communication with and being spaced a distance from said lamp defined by said space;

wherein said lamp radiates a white light in said space through said translucent focusing head thereby providing illumination of said caricature head and further allowing illumination of at least a portion of said head by at least a portion of said longitudinal length of said fibers and said lamp simultaneously radiates through said color pallet whereby when light from said lamp is transmitted through said color pallet a particularly colored light beam is transmitted to the distal ends of said optical fibers while radiating white light along said longitudinal length of said fibers.

11. The fiber optic illumination toy according to claim 10, wherein each distal end of said fiber optic strands includes a saw cut so as to allow light dispersion at an angle inapposite to said longitudinal length of each said fiber optic strands.

12. The fiber optic illumination toy according to claim 10, wherein said caricature head is constructed from translucent, transparent and/or opaque PVC allowing a realistic representation under normal lighting conditions and a surreal view by internal illumination during low level lighting conditions.

13. The fiber optic illumination toy according to claim 10, wherein said optical fibers are constructed from opaque, transparent, or translucent flexible plastic fibers.

14. The fiber optic illumination toy according to claim 10, wherein said optical fibers form a whisk broom array wherein said fibers at cut along different lengths.

15. The fiber optic illumination toy according to claim 10, wherein said color pallet is rotatable.

* * * * *